(12) United States Patent
Okada et al.

(10) Patent No.: US 8,001,814 B2
(45) Date of Patent: Aug. 23, 2011

(54) STEERING LOCK APPARATUS

(75) Inventors: Takahiro Okada, Kanagawa-ken (JP); Kenjirou Hayashi, Kanagawa-ken (JP); Ryuichi Yoshida, Kanagawa-ken (JP)

(73) Assignee: Alpha Corporation, Yokohama-shi, Kanagawa-ken (JP)

( * ) Notice: Subject to any disclaimer, the term of this patent is extended or adjusted under 35 U.S.C. 154(b) by 274 days.

(21) Appl. No.: 12/312,084

(22) PCT Filed: Nov. 8, 2007

(86) PCT No.: PCT/JP2007/071689
§ 371 (c)(1), (2), (4) Date: Apr. 24, 2009

(87) PCT Pub. No.: WO2008/056728
PCT Pub. Date: May 15, 2008

(65) Prior Publication Data
US 2010/0064742 A1    Mar. 18, 2010

(30) Foreign Application Priority Data
Nov. 10, 2006  (JP) ................................. 2006-305374

(51) Int. Cl.
*B60R 25/02* (2006.01)
(52) U.S. Cl. ........................................... 70/186; 70/252
(58) Field of Classification Search ............ 70/182–186, 70/252
See application file for complete search history.

(56) References Cited

U.S. PATENT DOCUMENTS 6,439,011 B1 * 8/2002 Frick et al. ....................... 70/185
6,915,671 B2 * 7/2005 Zillmann ........................ 70/186

(Continued)

FOREIGN PATENT DOCUMENTS
EP    0 071 803 A1    2/1983
(Continued)

OTHER PUBLICATIONS

The Supplementary European Search Report issued Jul. 23, 2010, in counterpart European Application No. 07831420.

*Primary Examiner* — Suzanne Barrett
(74) *Attorney, Agent, or Firm* — The Nath Law Group; Jerald L. Meyer; Robert T. Burns (57) ABSTRACT

A motor unit (9) and the like are arranged on a frame body (3) covered with a cover (6). A rod guide portion (4) is protruded from the frame body (3). A lock rod (14) is disposed in this rod guide portion (4) so as to be freely movable. Weak portions (17, 18) are provided on the rod guide portion (4) and the lock rod (14), respectively. A deadlock mechanism (30) is disposed closer to a tip end side of the rod guide portion (4) than the guide-side weak portion (17) thereof. The deadlock mechanism (30) includes: a lock pin (31) urged to a deadlock engagement position where a region of the lock rod (14), which is closer to the tip end side than the rod-side weak portion (18), is locked; and a lock control member (33) that inhibits movement of the lock pin (31) to a locked position thereof before the weak portions (17, 18) are cut off, and releases such regulation to the lock pin (31) after the weak portion (17, 18) are cutoff. The lock control member (33) is disposed in a region where the movement of the lock pin (31) is regulated by assembling force between the cover (6) and the frame body (3). When the cover (6) is detached from the frame body (3), the lock control member (33) positionally shifts in a direction of releasing the regulation of the movement of the lock pin (31).

5 Claims, 10 Drawing Sheets

U.S. PATENT DOCUMENTS

| | | | |
|---|---|---|---|
| 7,055,351 B2 * | 6/2006 | Suzuki et al. | 70/186 |
| 7,104,097 B2 * | 9/2006 | Zillmann | 70/186 |
| 7,121,126 B2 * | 10/2006 | Zillmann | 70/186 |
| 7,703,309 B2 * | 4/2010 | Okuno et al. | 70/186 |
| 7,823,426 B2 * | 11/2010 | Okuno et al. | 70/186 |
| 2004/0148983 A1 | 8/2004 | Suzuki et al. | |
| 2009/0266122 A1 * | 10/2009 | Okada et al. | 70/252 |

FOREIGN PATENT DOCUMENTS

| | | | |
|---|---|---|---|
| GB | 2257676 A | * | 1/1993 |
| JP | 11-310104 A | | 11/1999 |
| JP | 2004-231122 | | 8/2004 |

* cited by examiner

STEERING LOCK APPARATUS

This is an National Phase Application filed under 35 U.S.C. §371 as a national stage of PCT/JP2007/071689, with the filing date of Nov. 8, 2007, an application claiming the benefit under 35 USC §119(b) of Japanese Patent Application No. 2006-305374, filed on Nov. 10, 2006, the entire content of which is hereby incorporated by reference in its entirety.

TECHNICAL FIELD

The present invention relates to a steering lock apparatus that is mounted on an automobile or the like and includes a so-called deadlock mechanism.

BACKGROUND ART

Figure 1:
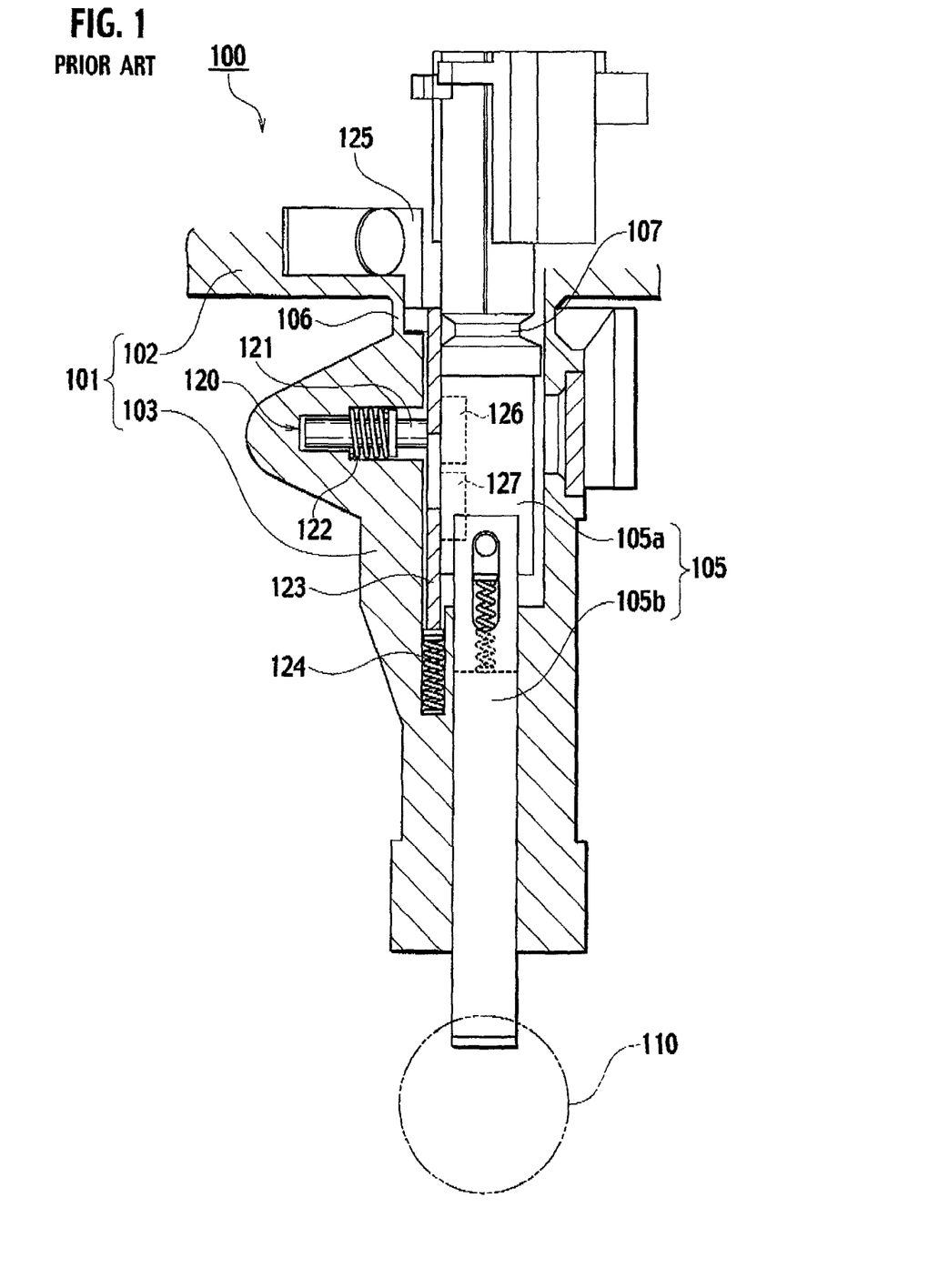
FIG. 1 is a cross-sectional view showing a steering locked state of a conventional electric steering lock apparatus.
Figure 2:
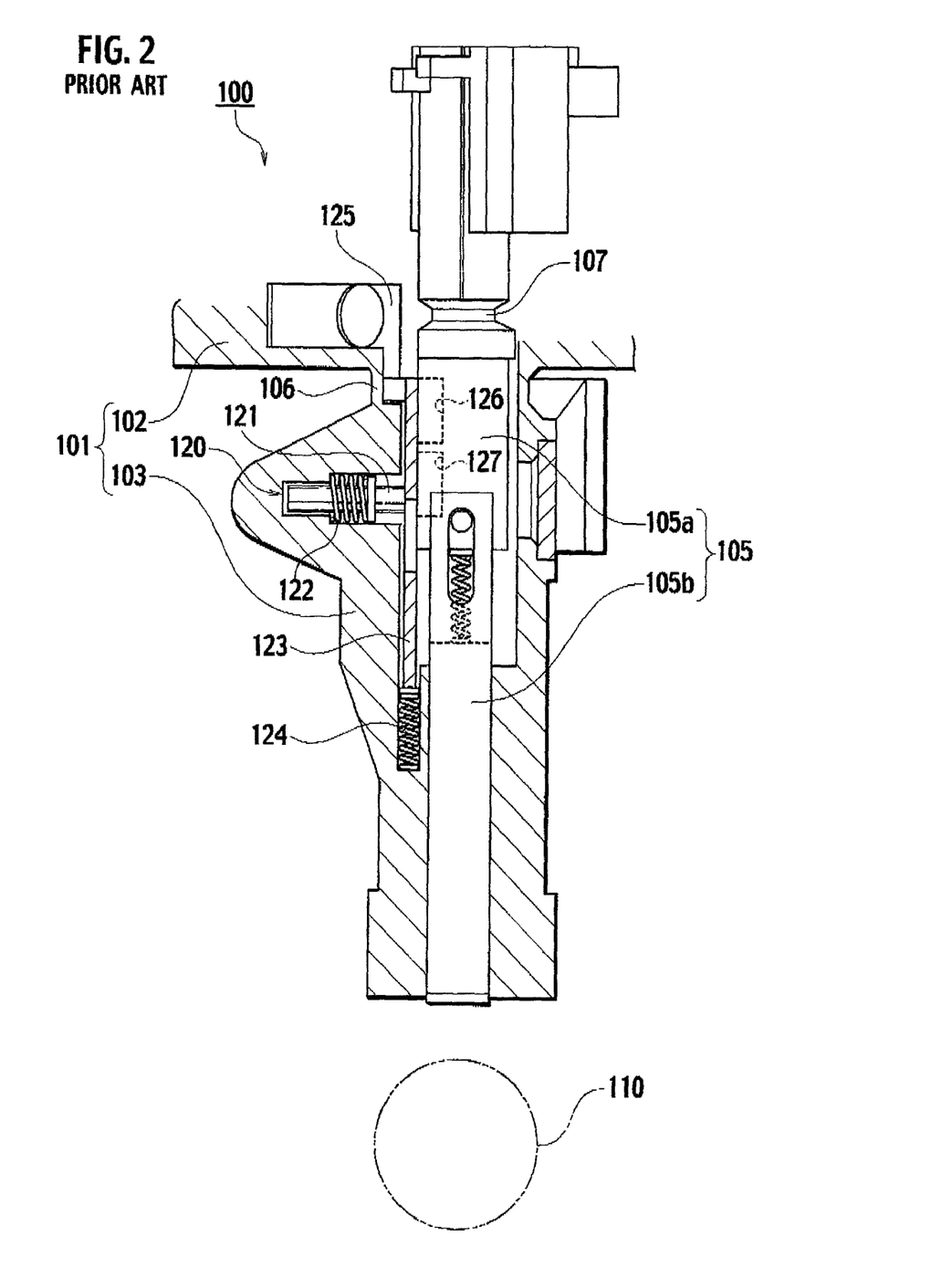
FIG. 2 is a cross-sectional view showing a steering unlocked state of the conventional electric steering lock apparatus.

As this type of a conventional steering lock apparatus, there is one disclosed in Japanese Patent Laid-Open Publication No. 2004-231122. As shown in FIG. 1 and FIG. 2, this electric steering lock apparatus 100 includes a frame 101 and a cover (not shown) that covers an upper surface of this frame 101. The frame 101 includes a frame body 102 and a rod guide portion 103 protruded from this frame body 102.

On an upper surface of the frame body 102 covered with the cover, there are housed: a drive motor (not shown) controlled by an operation for an ignition key by a person who carries an electronic key; a cam member (not shown) that rotates by drive of this drive motor; and the like. In the rod guide portion 103, a lock rod 105 in which an upper end side protrudes on the frame body 102 is housed so as to be freely movable. This lock rod 105 is composed of an upper rod portion 105a and a lower rod portion 105b coupled thereto, and moves, by the rotation of the above-described cam member (not shown), to a locked position (position of FIG. 1) where a steering shaft 110 is locked and to an unlocked position (position of FIG. 2) where the rotation of the steering shaft 110 is permitted.

On a base end spot of the rod guide portion 103 and a middle spot of the upper rod portion 105a of the lock rod 105, weak portions 106 and 107 thinner in thickness than other spots are provided.

A deadlock mechanism 120 includes: a lock pin 121 housed closer to a tip end side of the rod guide portion 103 than the weak portion 106 thereof; a first spring 122 that urges the lock pin 121 in a protruding direction; a lock control member 123 that regulates movement of the lock pin 121 in a protruding direction; a second spring 124 that urges the lock control member 123 upward; a stopper 125 that is fixed to the frame body 102 and regulates upward movement of the lock control member 123; and first and second engagement grooves 126 and 127 formed on the upper rod portion 105a.

In the above-described configuration, when the person who carries the electronic key turns the ignition key from an OFF position to an ON position in order to run a vehicle, the lock rod 105 moves by the drive of the drive motor (not shown), and the electric steering lock apparatus 100 turns from a steering locked state of FIG. 1 to a steering unlocked state of FIG. 2. Thereafter, when the ignition key is rotated to an engine start position, an engine is started. When an impact with a predetermined value or more is applied to the rod guide portion 103 and the lock rod 105 as a result of that the vehicle radically slows down during the running thereof and the knees of a driver collide with the electric steering lock apparatus 100 in this case, the rod guide portion 103 and the lock rod 105 are cut off at the spots of the weak portions 106 and 107, whereby an impact received by the driver is reduced.

Figure 3:
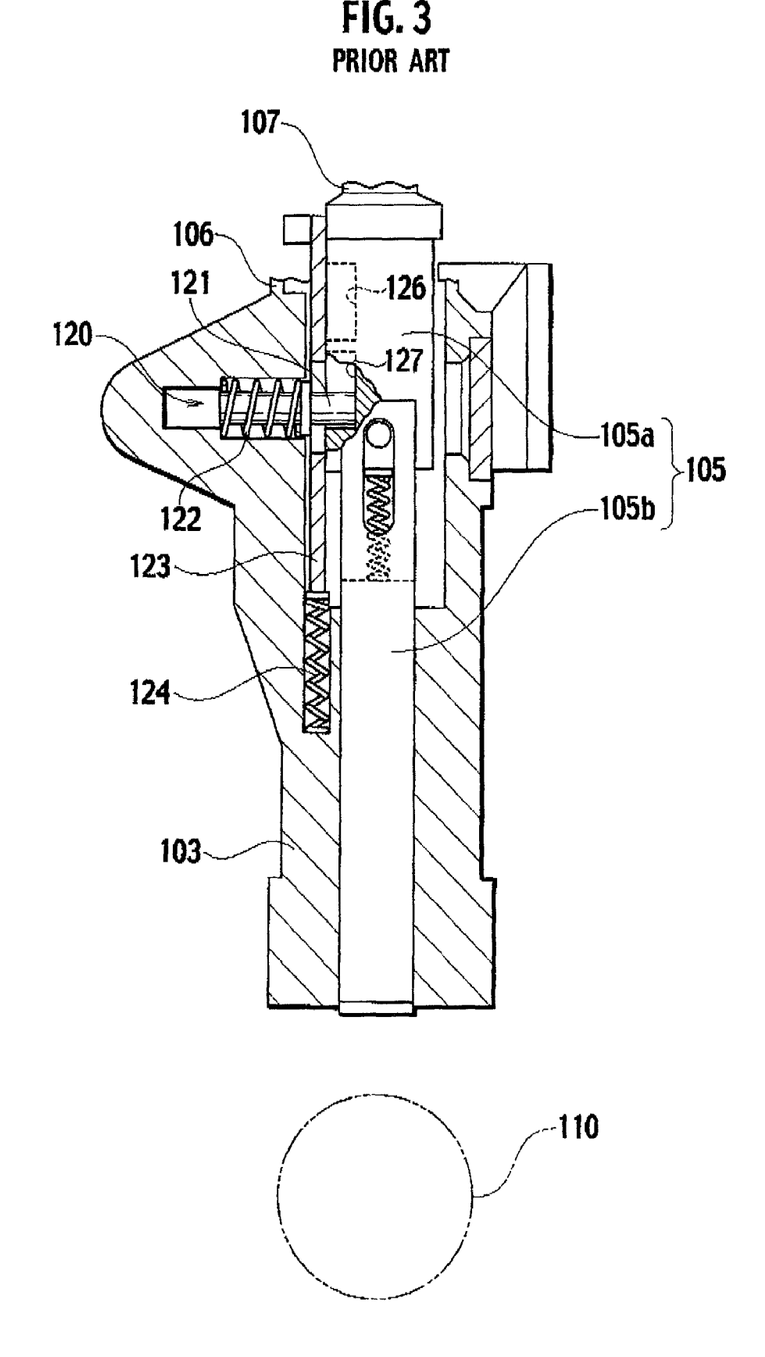
FIG. 3 is a cross-sectional view of the conventional electric steering lock apparatus when a deadlock mechanism is actuated in the steering unlocked state.

Then, when the rod guide portion 103 and the lock rod 105 are cut off at the weak portions 106 and 107, as shown in FIG. 3, the stopper 125 comes not to regulate the lock control member 123, the lock control member 123 moves upward by spring force of the second spring 124, and the lock pin 121 is engaged with the second engagement groove 127 of the lock rod 105. In such a way, the unlocked state of the steering shaft 110 is held even after the electric steering lock apparatus 100 is cut off, and driving safety is ensured.

Moreover, when the person who carries the electronic key returns the ignition key from the engine start position to the OFF position in order to park the vehicle, the engine is stopped, and in addition, the lock rod 105 moves by the drive of the drive motor (not shown), and the electric steering lock apparatus 100 turns from the steering unlocked state of FIG. 2 to the steering locked state of FIG. 1.

Figure 4:
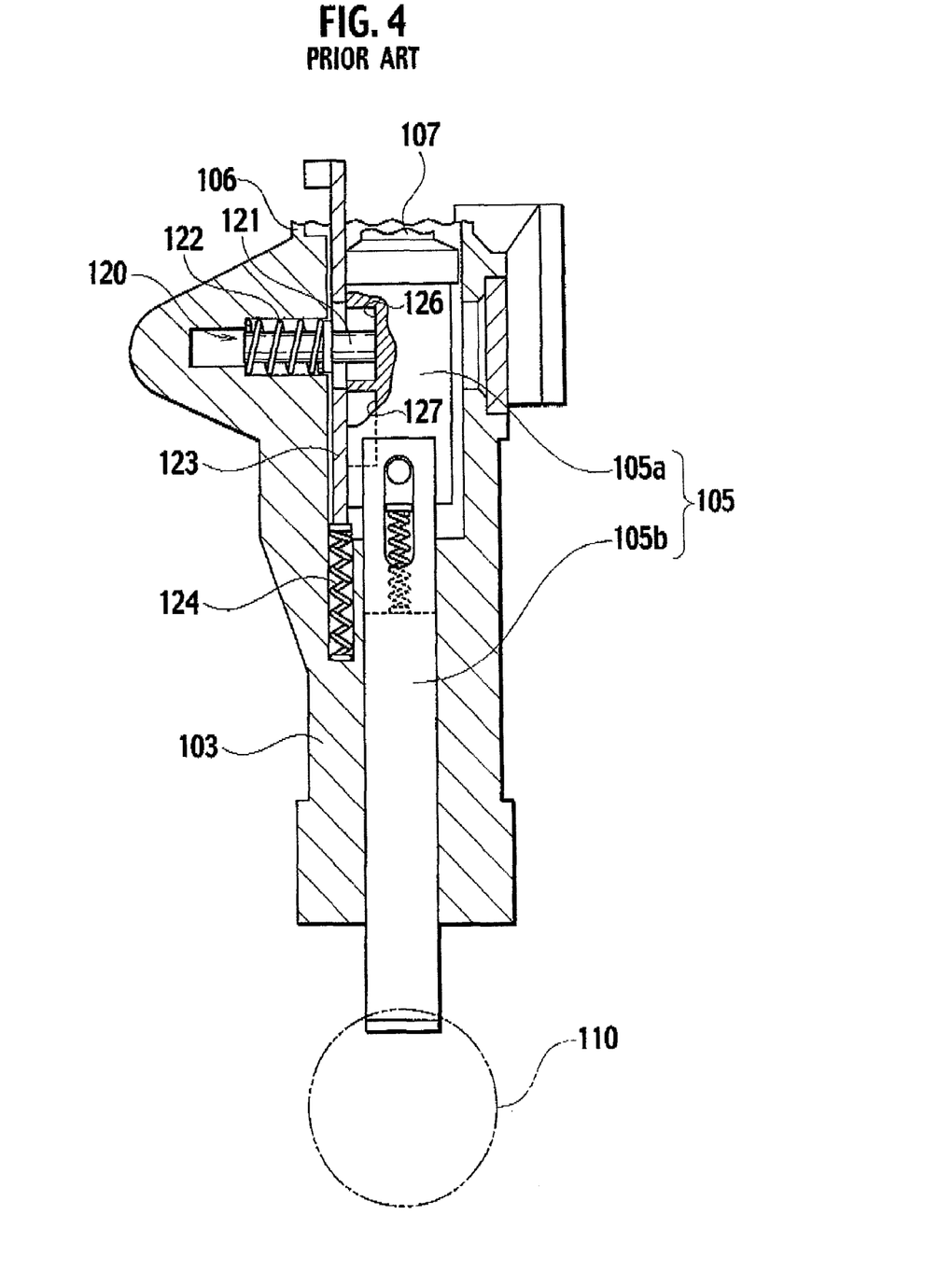
FIG. 4 is a cross-sectional view of the conventional electric steering lock apparatus when the deadlock mechanism is actuated in the steering locked state.

In this steering locked state, when a person who aims to fraudulently unlock the electric steering lock apparatus 100 attacks the same from the outside, and the impact with the predetermined value or more is applied to the electric steering lock apparatus 100, the rod guide portion 103 and the lock rod 105 are cut off at the spots of the weak portions 106 and 107. Then, as shown in FIG. 4, the stopper 125 comes not to regulate the lock control member 123, the lock control member 123 moves upward by the spring force of the second spring 124, and the lock pin 121 is engaged with the first engagement groove 126 of the lock rod 105. In such a way, the locked state of the steering shaft 110 is held even after the electric steering lock apparatus 100 is cut off, and accordingly, the electric steering lock apparatus 100 is excellent in stealing prevention properties.

DISCLOSURE OF THE INVENTION

However, in the above-described conventional electric steering lock apparatus 100, it is considered that the person who will fraudulently unlock the electric steering lock apparatus 100 concerned fraudulently unlocks the same by attacking the cover (not shown) so as not to apply predetermined or more external force to the rod guide portion 103 and the lock rod 105 and detaching the cover from the frame body 102. Hence, it is desired that the stealing prevention properties be enhanced so as to become higher than heretofore.

In this connection, it is an object of the present invention to provide a steering lock apparatus that can also cope with such a fraudulent attack to the cover and is excellent in stealing prevention properties.

In order to achieve the above-described object, a first aspect of the invention of this application provides a steering lock apparatus, including: a drive mechanism portion disposed on a frame body covered with a cover; a rod guide portion protruded on the frame body, the rod guide portion including a guide-side weak portion; a lock rod disposed in the rod guide portion so as to be freely movable, the lock rod being moved between a locked position and an unlocked position by the drive mechanism portion, and including a rod-side weak portion; and a deadlock mechanism that, when the rod guide portion and the lock rod are cut off at positions of the guide-side weak portion and the rod-side weak portion, holds a rod tip end-side region located closer to a tip end side of the lock rod than the rod-side weak portion thereof at a position at a point of this cutoff time, wherein the deadlock mechanism includes: a lock recessed portion disposed on either one of the rod tip end-side region and the rod guide portion; a lock pin that is disposed on the other one of the rod tip end-side region and the rod guide portion so as to be urged toward the lock recessed portion, and is formed so as to be engageable with the lock recessed portion; and a lock control member that, in a state where the rod guide portion and the lock rod are not cut off at the guide-side weak portion and the rod-side weak portion, inhibits movement of the lock pin to a deadlock engagement position where the lock recessed portion and the lock pin engage with each other, and in a state where the rod guide portion and the lock rod are cut off at the guide-side weak portion and the rod-side weak portion, releases regulation of movement of the lock pin to the deadlock engagement position, and the lock control member is disposed at a position of inhibiting the movement of the lock pin to the deadlock engagement position by assembling force between the cover and the frame body, and is composed so as to hold the rod tip end-side region at the locked position while positionally shifting in a pin releasing direction of releasing the regulation of the movement of the lock pin when the cover is detached from the frame body.

In accordance with the first aspect of the invention of this application, when the person who aims to fraudulently unlock the steering lock apparatus attacks the same from the outside, and the impact with the predetermined value or more is applied to the rod guide portion and the lock rod, the rod guide portion and the lock rod are cut off at the spots of the weak portions. Then, the lock control member moves in the pin releasing direction, and the lock pin locks the lock rod. Moreover, when the person who aims to fraudulently unlock the steering lock apparatus attacks the cover so as not to apply the predetermined or more external force to the rod guide portion and the lock rod, and detaches the cover from the frame body, the lock control member moves in the pin releasing direction, and the lock pin locks the lock rod. Hence, the steering lock apparatus according to the first aspect can cope with not only the case of receiving such a fraudulent attack that the predetermined or more external force is applied to the rod guide portion and the lock rod, but also the case of receiving such a fraudulent attack to fraudulently open the cover, and is excellent in stealing prevention properties.

BEST MODE FOR CARRYING OUT THE INVENTION

A description will be made below of an embodiment of the present invention based on the drawings.

As shown in FIG. 1 to FIG. 4, an electric steering lock apparatus 1 as a steering lock apparatus has a frame 2, and this frame 2 includes a frame body 3 and a rod guide portion 4 protruded on a lower side of this frame body 3. In the frame body 3 and the rod guide portion 4, respective bolt insertion holes 5 for fixing the electric steering lock apparatus 1 to a vehicle body side are provided at appropriate positions thereof.

A lower end portion of a cover 6 is inserted into a fitting groove 7 formed on a peripheral edge of an upper surface of the frame body 3, and the cover 6 is assembled to the frame body 3 by engagement pins 8 (shown in FIG. 4) provided at plural spots.

On the upper surface of the frame body 3 covered with the cover 6, there are housed: an ignition key (not shown) rotationally operable by a person who carries an electronic key; a motor unit 9 of which drive is controlled by a rotational operation for this ignition key; a cam member 10 fixed to an output shaft of this motor unit 9; a steering lock prevention unit 20; and the like. The motor unit 9 is composed of a drive motor (not shown) and a speed reduction mechanism (not shown) that reduces speed of rotation of this motor and outputs the rotation of the motor, and a drive mechanism portion is composed of the motor unit 9 and the cam member 10. Moreover, a control unit 12 is fixed to a lower surface of the frame body 3.

In the rod guide portion 4, a rod guide hole 13 is formed. One end side of this rod guide hole 13 is opened to the upper surface of the frame body 3 covered with the cover 6, and the other end side thereof is opened to the outside.

A lock rod 14 is composed of an upper rod portion 14a as a rod base end-side region, and a lower rod portion 14b as a rod tip end-side region coupled thereto, and is disposed in the rod guide hole 13 so as to be freely movable. An upper end side of the upper rod portion 14a protrudes on the frame body 3. On an upper end of the upper rod portion 14a that protrudes on the frame body 3, a hanger portion 15 is provided integrally therewith. On an upper surface of the upper rod portion 14a, a spring 16 that urges the lock rod 14 to a locked position side to be described later is disposed, and by spring force of this spring 16, a lower surface of the hanger portion 15 is brought into pressure contact with the cam member 10. In such a way, the lock rod 14 moves following a cam surface of the cam member 10, and moves between a locked position (position of FIG. 2 and FIG. 3) where rotation of a steering shaft (not shown) is inhibited and an unlocked position where the rotation of the steering shaft (not shown) is permitted.

The steering lock prevention unit 20 includes: a unit frame 21 screwed to the frame body 3; and an electromagnetic solenoid 22 fixed to this unit frame 21. A base end side of a lock plate 23 is fixed to a retractable rod 22a of this electromagnetic solenoid 22. A tip end of this lock plate 23 extends to a position near the lock rod 14. Then, when the electromagnetic solenoid 22 is off in the case where the lock rod 14 is located at the unlocked position, the lock plate 23 enters an engagement recessed portion 24 of the lock rod 14 by a spring 22b, and inhibits the movement of the lock rod 14. When the electromagnetic solenoid 22 turns on, the lock plate 23 leaves the engagement recessed portion 24 of the lock rod 14, and permits the movement of the lock rod 14. Specifically, the steering lock prevention unit 20 surely prevents the lock rod 14 from moving to the locked position owing to an impact and the like while a vehicle is running after an engine is started.

Moreover, on a base end spot of the rod guide portion 4, and on a coupled spot of the upper rod portion 14a and lower rod portion 14b of the lock rod 14, a guide-side weak portion 17 and a rod-side weak portion 18, which are weaker in terms of strength than other spots, are provided. When external force with a predetermined value or more is applied to the rod guide portion 4 and the lock rod 14, the electric steering lock apparatus 1 is adapted to be cut off at spots of the guide-side weak portion 17 of the rod guide portion 4 and the rod-side weak portion 18 of the lock rod 14.

The deadlock mechanism 30 includes: a lock pin 31 that is disposed closer to a tip end side of the rod guide portion 4 than the guide-side weak portion 17 thereof, and is positionally shiftable between a deadlock standby position where the lock rod 14 is not locked and a deadlock engagement position where the lock rod 14 is held at the locked position; a spring 32 that urges this lock pin 31 to a deadlock engagement position side; a lock control member 33 that holds the lock pin 31 at the deadlock standby position so that the lock pin 31 cannot move to the deadlock engagement position; and first and second engagement grooves 34 and 35 as lock recessed portions formed on the lower rod portion 14b of the lock rod 14.

The lock control member 33 is formed by bending one piece of sheet metal with a predetermined shape, and is composed of: a middle horizontal portion 33a; a lower vertical portion 33b extending downward from one end side of this middle horizontal portion 33a; and an upper vertical portion 33c extending upward from the other end side of the middle horizontal portion 33a. The lower vertical portion 33b is inserted into a guide hole 36 of the rod guide portion 4, and a tip end thereof is disposed at a regulation position where the lock pin 31 is held at the deadlock standby position. The middle horizontal portion 33a and the upper vertical portion 33c are disposed on the frame body 3 covered with the cover 6, and an upper end of the upper vertical portion 33c abuts on an inner wall of the cover 6. Specifically, the lock control member 33 is supported by assembling force between the cover 6 and the frame body 3, and when the rod guide portion 4 is cut off at the guide-side weak portion 17, the lock control member 33 releases such regulation of the movement of the lock pin 31 in such a manner that the rod guide portion 4 becomes spaced from the frame body 3.

Moreover, the middle horizontal portion 33a and the upper vertical portion 33c, which are arranged on the frame body 3, are arranged so that only side surfaces thereof on a plate thickness side can come into view when viewed from an upper surface side of the cover 6 (refer to FIG. 1).

Furthermore, peripheries of the middle horizontal portion 33a and the upper vertical portion 33c, which are arranged on the frame body 3, are surrounded by protection walls 40 of the frame body 3. The protection walls 40 are formed so as to guide movement of the lock control member 33 in a pin releasing direction a.

At a position surrounded by the protection walls 40, which is also between a spring-receiving protruding surface of the upper vertical portion 33c and the frame body 3, a release spring 37 for the compressed coil spring is interposed in a compressed state. Specifically, the lock control member 33 is composed so as to positionally shift in the pin releasing direction a of releasing the regulation of the movement of the lock pin 31 when the cover 6 is detached from the frame body 3 though the lock control member 33 concerned is usually located at the position of regulating the movement of the lock pin 31 by the assembling force between the cover 6 and the frame body 3.

The first engagement groove 34 is set at a position opposite to the lock pin 31 in the case where the lock rod 14 is located at the locked position. The second engagement groove 35 is set at a position opposite to the lock pin 31 in the case where the lock rod 14 is located at the unlocked position.

In the above-described configuration, when the person who carries the electronic key rotates the ignition key (not shown) from an OFF position to an ON position in order to run the vehicle, the lock rod 14 moves by drive of the motor unit 9, and positionally shifts from the locked position of FIG. 2 and FIG. 3 to the unlocked position. Thereafter, when the ignition key is moved to an engine start position, the engine is started.

When an impact with a predetermined value or more is applied to the rod guide portion 4 and the lock rod 14 as a result of that the vehicle radically slows down during the running thereof and the knees of a driver collide with the electric steering lock apparatus 1 in this case, the rod guide portion 4 and the lock rod 14 are cut off at the spots of the weak portions 17 and 18, whereby an impact received by the driver is reduced.

Then, when the rod guide portion 4 and the lock rod 14 are cut off at the guide-side weak portion 17 and the rod-side weak portion 18, the lock control member 33 comes not to regulate the lock pin 31, and the lock pin 31 is engaged with the second engagement groove 35 of the lock rod 14. In such a way, even after the electric steering lock apparatus 1 is cut off, an unlocked state of the steering shaft (not shown) is held. The unlocked state of the steering shaft (not shown) is held, whereby a steering wheel can be freely steered while the vehicle is running, and driving safety is ensured.

When the person who carries the electronic key returns the ignition key from the engine start position to the OFF position in order to park the vehicle, the engine is stopped, and in addition, the lock rod 14 moves by the drive of the motor unit 9, and positionally shifts from such a steering unlocked position to such a steering locked position of FIG. 2 and FIG. 3.

In this steering locked state, when a person who aims to fraudulently unlock the electric steering lock apparatus 1 attacks the same from the outside, and an impact with the predetermined value or more is applied to the rod guide portion 4 and the lock rod 14, the rod guide portion 4 and the lock rod 14 are cut off at the guide-side weak portion 17 and the rod-side weak portion 18. Then, the lock control member 33 comes not to regulate the lock pin 31, and the lock pin 31 is engaged with the first engagement groove 34 of the lower rod portion 14b of the lock rod 14. In such a way, the locked state of the steering shaft (not shown) is held even after the electric steering lock apparatus 1 is cut off, and the person who aims to fraudulently unlock the electric steering lock apparatus 1 cannot rotate the steering shaft freely.

Figure 5:
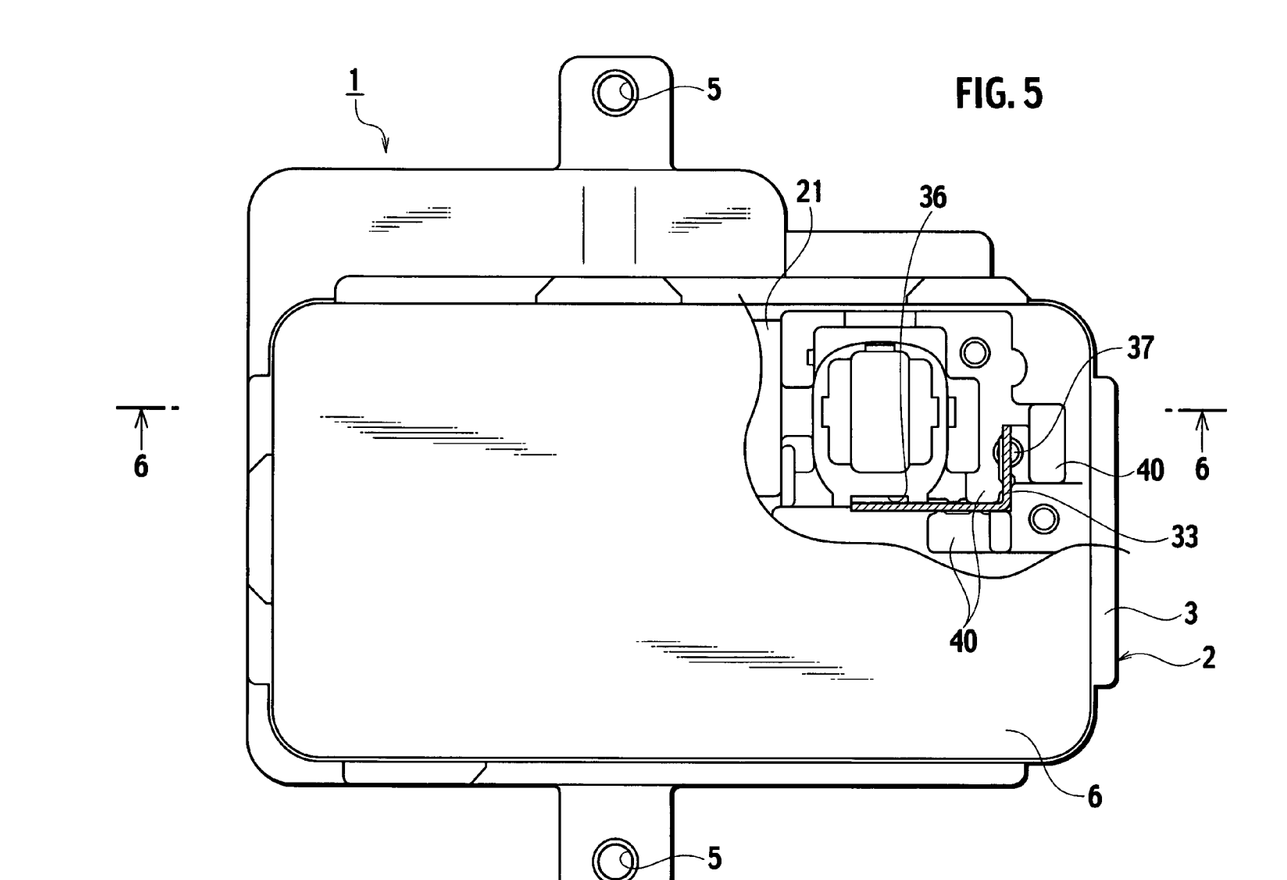
FIG. 5 is a plan view of an electric steering lock apparatus, showing an embodiment of the present invention.
Figure 6:
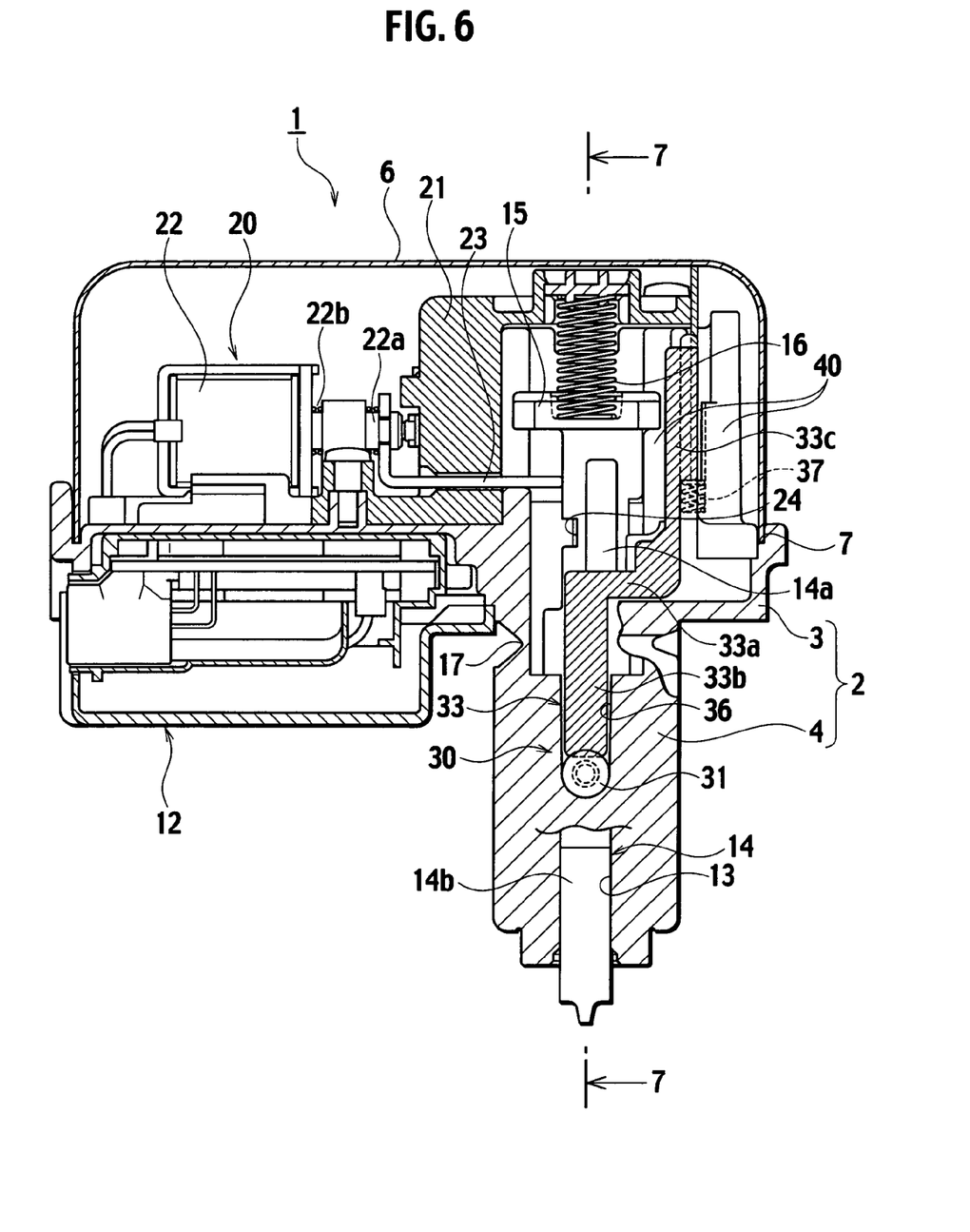
FIG. 6 is a cross-sectional view of the electric steering lock apparatus in a steering locked state along a line 6-6 of FIG. 5 and a state where a cover is normally assembled to a frame body, showing the embodiment of the present invention.
Figure 7:
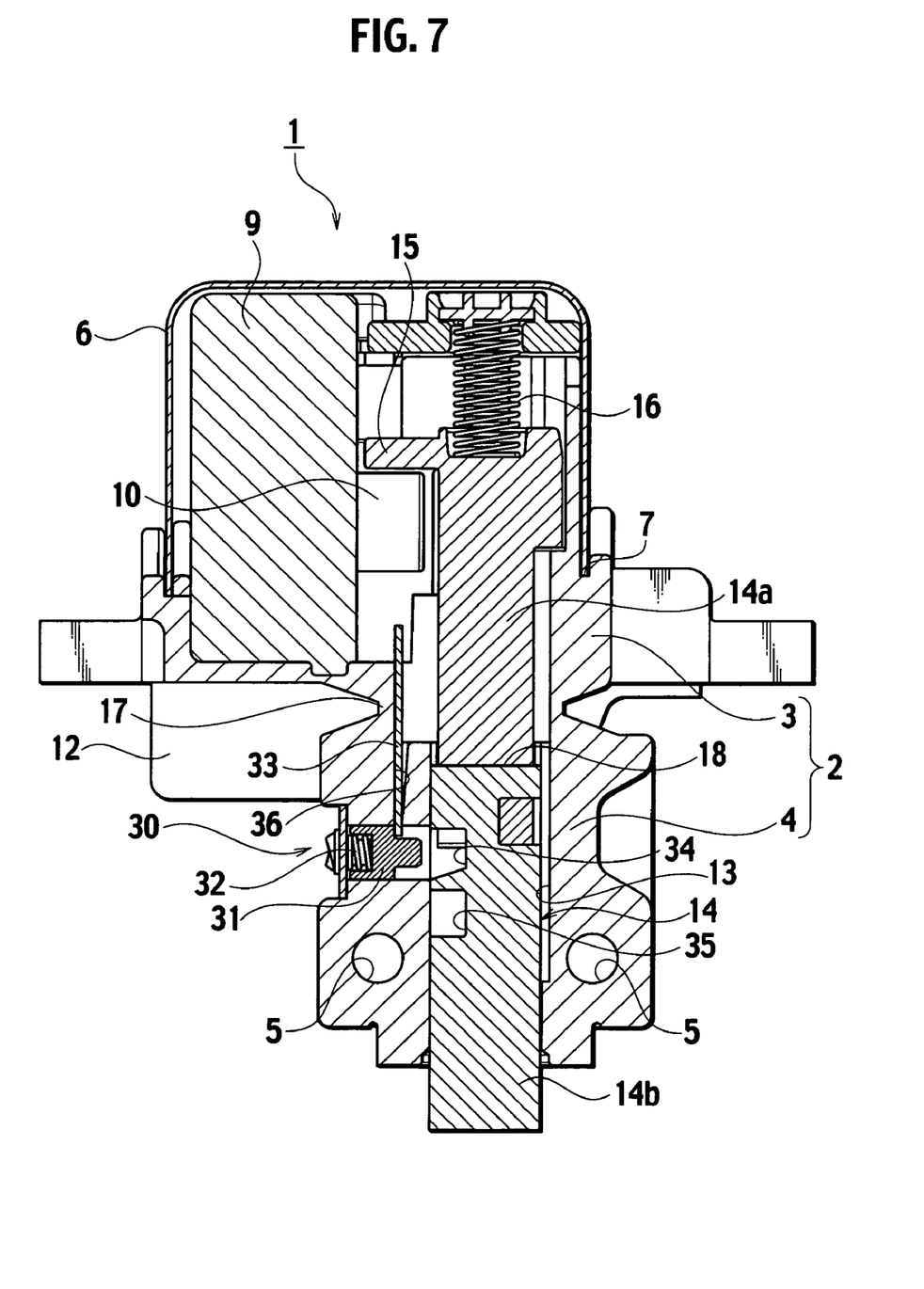
FIG. 7 is a cross-sectional view of the electric steering lock apparatus along a line 7-7 of FIG. 6, showing the embodiment of the present invention.
Figure 8:
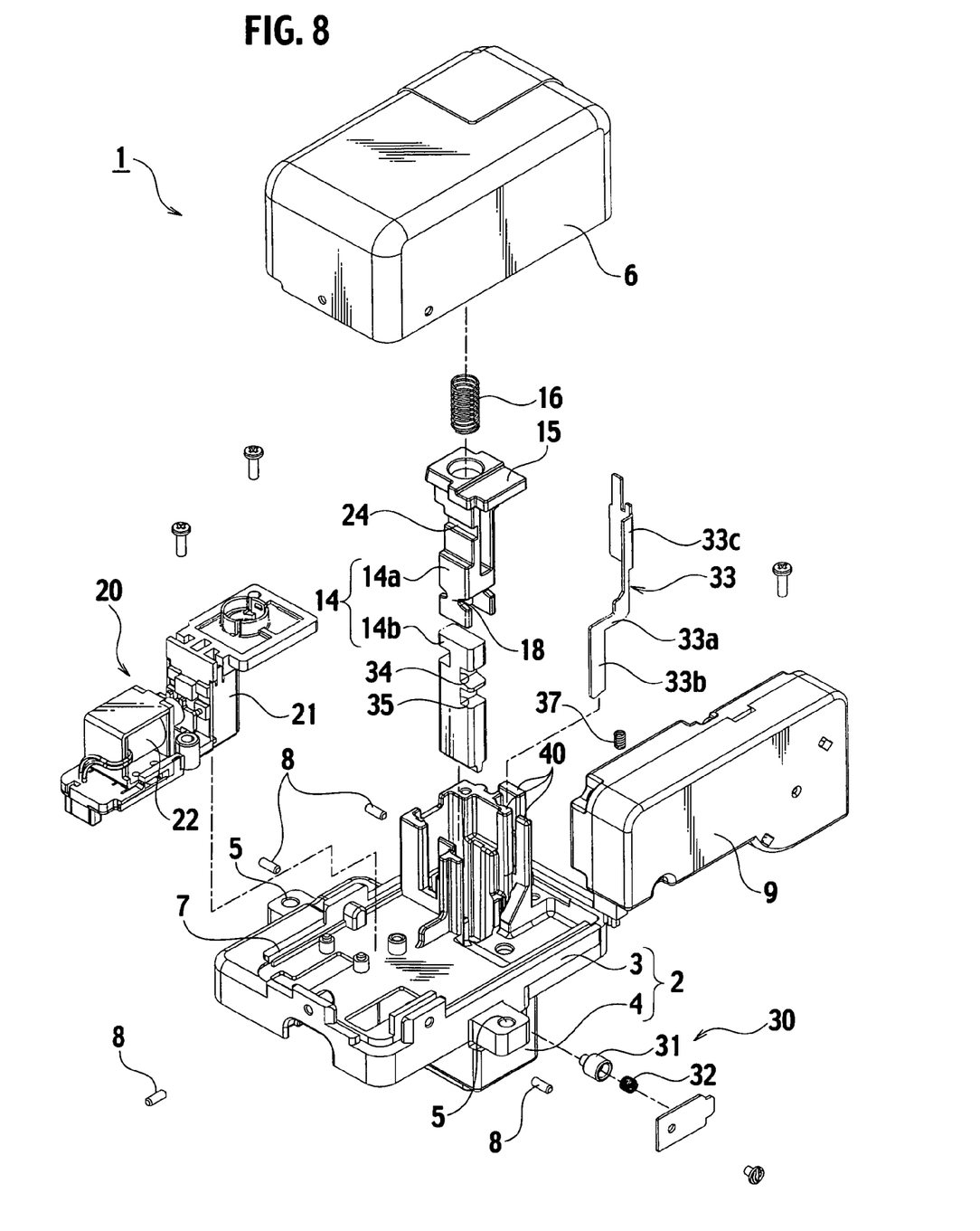
FIG. 8 is a main portion exploded perspective view of the electric steering lock apparatus, showing the embodiment of the present invention.
Figure 9:
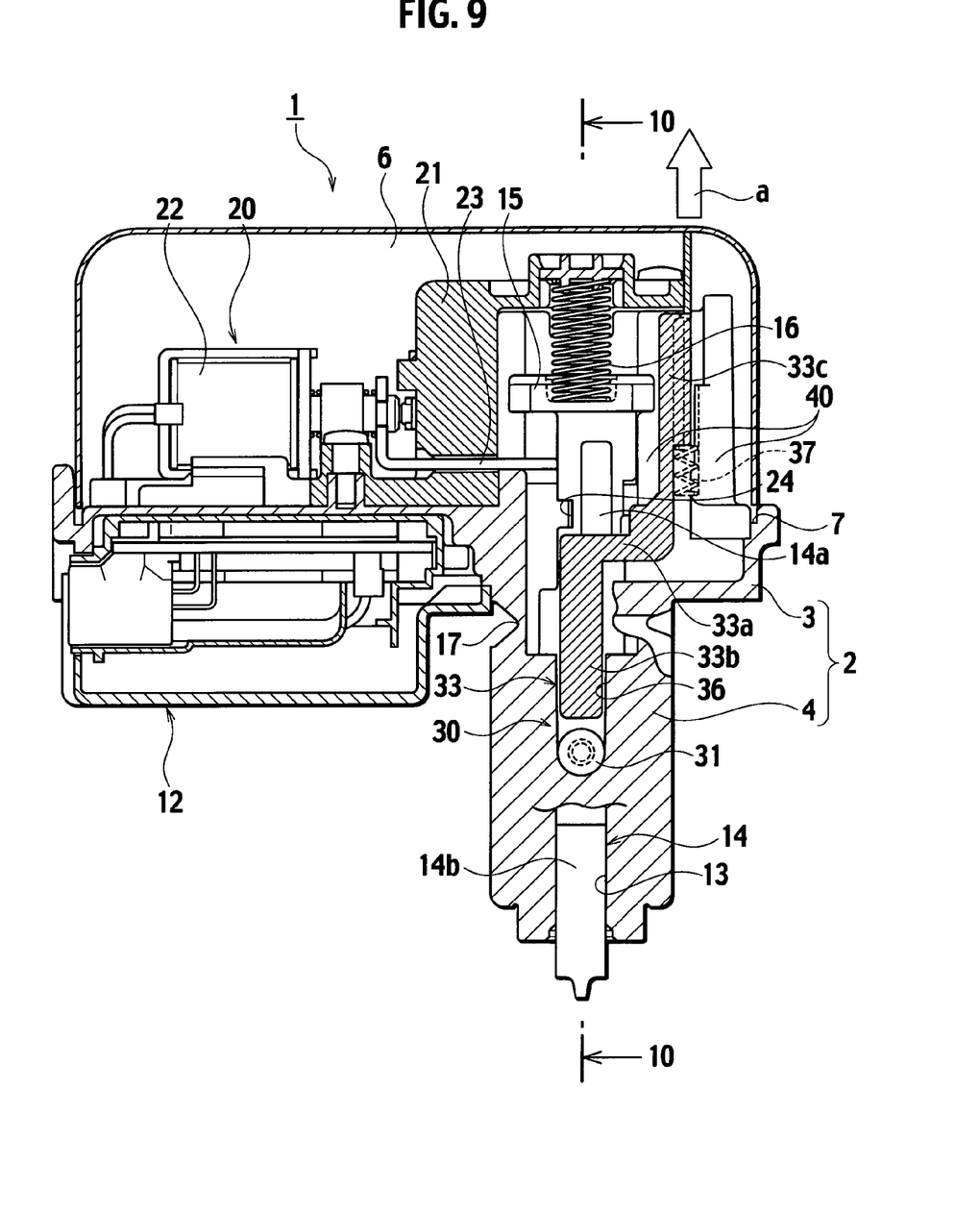
FIG. 9 is a cross-sectional view of the electric steering lock apparatus in the steering locked state along the line 6-6 of FIG. 5 and a state where the cover is detached a little from the frame body, showing the embodiment of the present invention.
Figure 10:
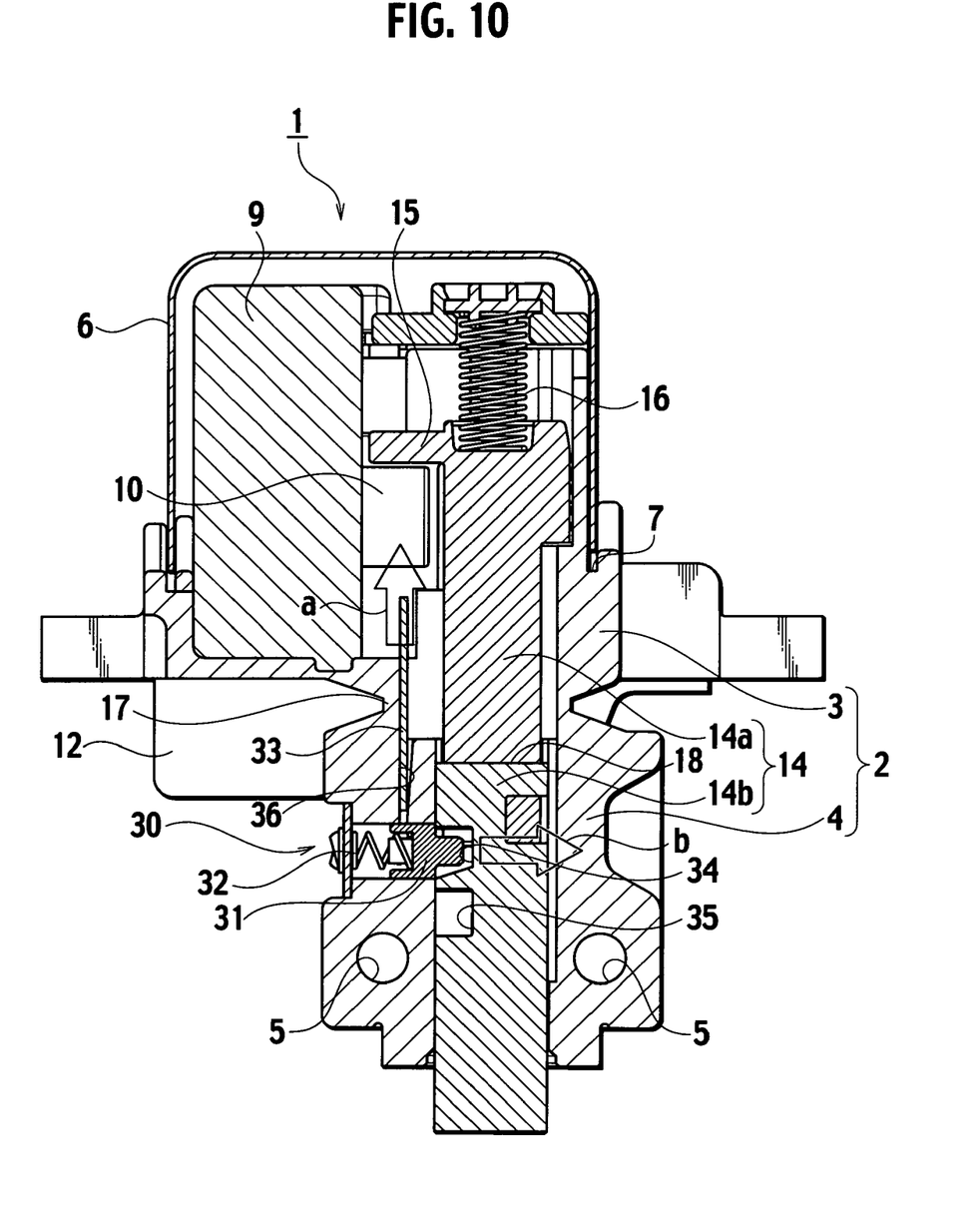
FIG. 10 is a cross-sectional view along a line 10-10 of FIG. 9, showing the embodiment of the present invention.

Moreover, it is considered that, in the steering locked state, the person who aims to fraudulently unlock the electric steering lock apparatus 1 attacks the cover 6 so as not to apply the predetermined or more external force to the rod guide portion 4 and the lock rod 14, and detaches the cover 6 from the frame body 3. If the cover 6 is detached from the frame body 3 even to a small extent, then, as shown in FIG. 5 and FIG. 6, the lock control member 33 moves in the pin releasing direction a by spring force of the release spring 37, and the lock pin 31 moves in a locking direction b, and is engaged with the first engagement groove 34 of the lower rod portion 14b of the lock rod 14. In such a way, the locked state of the steering shaft is held even after the cover 6 is opened, and the person who aims to fraudulently unlock the electric steering lock apparatus 1 cannot freely rotate the steering shaft.

As described above, in the present invention, not only in the case where the electric steering lock apparatus 1 receives such a fraudulent attack that the predetermined or more external force is applied to the rod guide portion 4 and the lock rod 14, but also in the case where the electric steering lock apparatus 1 receives such a fraudulent attack to fraudulently open the cover 6, the locked state of the steering shaft is held, resulting in enhancement of stealing prevention properties.

In this embodiment, the deadlock mechanism 30 includes the release spring 37 that urges the lock control member 33 in the pin releasing direction, and is composed so that the lock control member 33 can positionally shift in the pin releasing direction a by the spring force of the release spring 37 when the cover 6 is detached from the frame body 3. Hence, when the cover 6 is detached from the frame body 3, the lock rod 14 can be surely locked by the spring force of the release spring 37. Moreover, in comparison with the conventional configuration, though it is necessary to change the shape of the lock control member 33 in this embodiment, the release spring 37 just needs to be added as a part, and such fraudulent opening of the cover 6 can be coped with by adding the minimum number of parts.

In this embodiment, on the frame body 3, there are provided the protection walls 40, which are arranged so as to surround the peripheries of the lock control member 33, and guide the movement of the lock control member 33 in the pin releasing direction a. Hence, even if a hole is opened in the cover 6, and a driver or the like is inserted from the hole to thereby attempt to press down the lock control member 33, the lock control member 33 cannot be pressed down easily since the protection walls 40 serve as obstacles. Hence, the stealing prevention properties can be enhanced. Moreover, the lock control member 33 moves smoothly in the pin releasing direction by being guided by the protection walls 40, and accordingly, the lock rod 14 can be surely locked.

In this embodiment, the release spring 37 is disposed at such a position surrounded by the protection walls 40, and in addition, is disposed between the lock control member 33 and the upper surface of the frame body 3. Hence, even if the hole is opened in the cover 6, and the driver or the like is inserted from the hole to thereby attempt to detach the release spring 37, the release spring 37 cannot be detached since the protection walls 40 and the lock control member 33 serve as the obstacles. Hence, the stealing prevention properties can be enhanced.

In this embodiment, the lock control member 33 is disposed so that the only side surface thereof on the plate thickness side can come into view when viewed from the upper surface side of the cover 6. Accordingly, even if the hole is opened in the cover 6, and the driver or the like is inserted from the hole to thereby attempt to press down the lock control member 33, the lock control member 33 cannot be pressed down easily since an area to be subjected to such pressing is small. Hence, the stealing prevention properties can be enhanced.

Note that, in this embodiment, the case has been shown, where the present invention is applied to the electric steering lock apparatus 1; however, it is a matter of course that the present invention can also be applied to such a mechanical steering lock apparatus that moves the lock rod 14 upon receiving, as power, operating force from a mechanical key.

Note that, in this embodiment, the lock rod 14 is composed of two parts, which are the upper rod portion 14*a* and the lower rod portion 14*b* which are coupled to each other; however, it is a matter of course that the lock rod 14 may be composed of a single part that has the rod-side weak portion 18.

Note that, in this embodiment, a configuration is adopted so that the lock control member 33 and the release spring 37 can be provided, and that the lock control member 33 can positionally shift in the pin releasing direction a by the spring force of the release spring 37 when the cover 6 is detached from the frame body 3; however, a configuration may be adopted so that spring properties can be imparted to the lock control member 33 itself (for example, the lock control member 33 can be formed of a spring material), and that the lock control member 33 can positionally shift in the pin releasing direction a by spring force of the lock control member 33 itself when the cover 6 is detached from the frame body 3 owing to the fraudulent attack. With such a configuration, the release spring also becomes unnecessary, resulting in further reduction of the number of parts. Moreover, a configuration is adopted so that, when the cover 6 is assembled to the frame body 3, the lock control member 33 can be coupled to the cover 6 in this assembling process. Then, a configuration may be composed so that the lock control member 33 can positionally shift in the pin releasing direction a when the cover 6 is detached from the frame body 3 owing to the fraudulent attack.

The invention claimed is:

1. A steering lock apparatus, comprising:
   a drive mechanism portion disposed on a frame body covered with a cover;
   a rod guide portion protruded on the frame body, the rod guide portion including a guide-side weak portion;
   a lock rod disposed in the rod guide portion so as to be freely movable, the lock rod being moved between a locked position and an unlocked position by the drive mechanism portion, and including a rod-side weak portion; and
   a deadlock mechanism that, when the rod guide portion and the lock rod are cut off at positions of the guide-side weak portion and the rod-side weak portion, holds a rod tip end-side region located closer to a tip end side of the lock rod than the rod-side weak portion thereof at a position at a point of this cutoff time,
   wherein the deadlock mechanism includes:
   a lock recessed portion disposed on either one of the rod tip end-side region and the rod guide portion;
   a lock pin that is disposed on the other one of the rod tip end-side region and the rod guide portion so as to be urged toward the lock recessed portion, and is formed so as to be engageable with the lock recessed portion; and
   a lock control member that, in a state where the rod guide portion and the lock rod are not cut off at the guide-side weak portion and the rod-side weak portion, inhibits movement of the lock pin to a deadlock engagement position where the lock recessed portion and the lock pin engage with each other, and in a state where the rod guide portion and the lock rod are cut off at the guide-side weak portion and the rod-side weak portion, releases regulation of movement of the lock pin to the deadlock engagement position, and
   the lock control member is disposed at a position of inhibiting the movement of the lock pin to the deadlock engagement position by assembling force between the cover and the frame body, and is composed so as to hold the rod tip end-side region at the locked position while positionally shifting in a pin releasing direction of releasing the regulation of the movement of the lock pin when the cover is detached from the frame body, wherein the deadlock mechanism includes a release spring that urges the lock control member in the pin releasing direction, and is configured so that the lock control member positionally shifts in the pin releasing direction by spring force of the release spring when the cover is at least partially detached from the frame body.

2. The steering lock apparatus according to claim 1, wherein a protection wall that is disposed so as to surround a periphery of the lock control member and guides movement of the lock control member in the pin releasing direction is provided on the frame body.

3. The steering lock apparatus according to claim 2, wherein the release spring is disposed in a region surrounded by the protection wall.

4. The steering lock apparatus according to claim 3, wherein the release spring is disposed between the lock control member and an upper surface of the frame body 3.

5. The steering lock apparatus according to claim 2, wherein the lock control member is made of a plate-like member, and is disposed so that only a side surface thereof on a plate thickness side can come into view when viewed from an upper surface side of the cover.

* * * * *